United States Patent [19]

McLean

[11] Patent Number: 5,439,539
[45] Date of Patent: Aug. 8, 1995

[54] COMPUTER CONTROLLED HEAT-SEALING MACHINE

[75] Inventor: Jack R. McLean, Richmond, Va.

[73] Assignee: Reynolds Metals Company, Richmond, Va.

[21] Appl. No.: 205,454

[22] Filed: Mar. 4, 1994

Related U.S. Application Data

[62] Division of Ser. No. 881,288, May 16, 1992, Pat. No. 5,322,586.

[51] Int. Cl.⁶ .................. B32B 31/00; B32B 31/20; B32B 35/00
[52] U.S. Cl. ...................... 156/64; 156/358; 100/50; 100/51; 100/52
[58] Field of Search .......... 156/64, 358, 359; 100/50, 51, 52

[56] References Cited

U.S. PATENT DOCUMENTS

| 314,598 | 3/1885 | Meek . | |
|---|---|---|---|
| 2,822,030 | 2/1958 | Pokras | 154/42 |
| 3,375,777 | 4/1968 | Techmann et al. | 100/93 |
| 3,692,811 | 9/1972 | Kuhnle | 156/358 |
| 3,708,177 | 12/1972 | Willet | 53/76 |
| 3,743,562 | 7/1973 | Phipps | 156/378 |
| 3,925,139 | 12/1975 | Simmons | 156/358 |
| 4,229,244 | 10/1980 | Swope | 156/358 |
| 4,317,897 | 3/1982 | McLean | 156/583.1 |
| 4,380,954 | 4/1983 | Edele | 100/50 X |
| 4,662,978 | 5/1987 | Old | 156/498 |
| 4,713,047 | 12/1987 | Klinkel | 493/34 |
| 4,923,558 | 5/1990 | Ellenberger et al. | 156/555 X |
| 5,115,735 | 6/1992 | Gloe et al. | 100/93 |
| 5,231,923 | 8/1993 | Ohta et al. | 156/583.1 X |

OTHER PUBLICATIONS

"Sealer Calibration", *Food Processing*, Jan. 1990.

*Primary Examiner*—David A. Simmons
*Assistant Examiner*—M. Curtis Mayes
*Attorney, Agent, or Firm*—Alan T. McDonald

[57] ABSTRACT

A computer controlled, laboratory heat-sealing machine is employed as a quality control device to ensure that adequate heat seals are formed under pre-defined and outputted pressure, dwell time and temperature parameters. The apparatus includes sensors for monitoring temperature and pressure conditions throughout the sealing dwell period. The clamping pressure is constantly adjusted to be maintained at a preset level by sensing the clamping pressure and controlling the top heat-sealing bar through an eccentrically driven crankshaft linkage. Load cell arrangements for monitoring pressure in high and low pressure ranges are also disclosed.

5 Claims, 17 Drawing Sheets

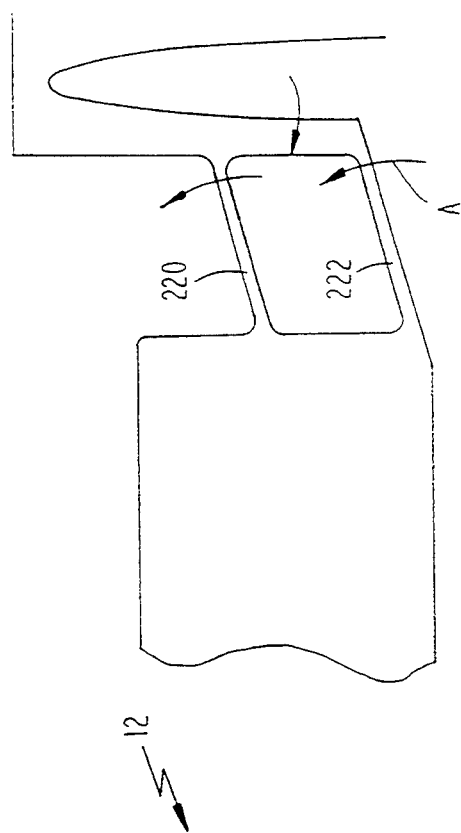
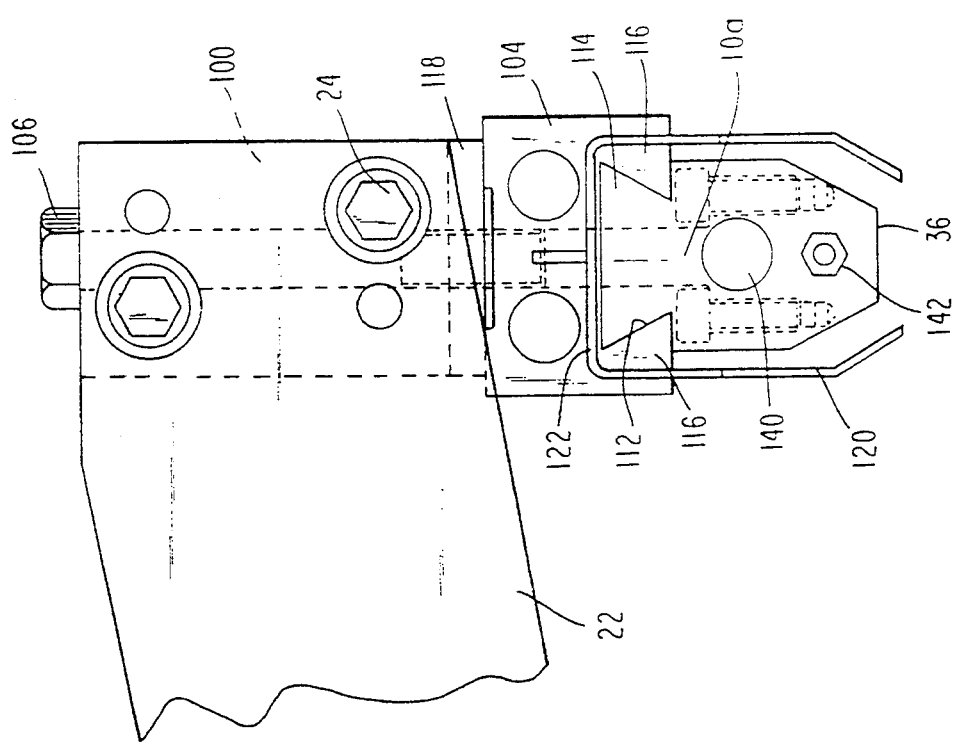
FIG. 11
FIG. 6

REYNOLDS ALUMINUM

REYNOLDS METALS COMPANY, FLEXIBLE PACKAGING DIVISION

TECHNOLOGY CENTER 2101 REYMET ROAD
RICHMOND VIRGINIA 23237-3799  TELEPHONE:(804) 743-6321
REYCON PRECISION LABORATORY SEALER
SOFTWARE PROGRAM DATE: MAY 1991

☐ Run EXISTING PROCESS
☐ Write NEW PROCESS
☐ Modify EXISTING PROCESS to create a NEW PROCESS
LOCATE PROGRAM TO BE MODIFIED WITH CURSER, PRESS ENTER.

| IDENTIFICATION NAME OR NUMBER | CREATED DATE | TEMPERATURE BAR / PAD | NUMBER OF SEAL CYCLES | PRESSURES | DWELLS |
|---|---|---|---|---|---|
| | | | | | |

USE SCROLL UP / DOWN ARROWS TO VIEW MORE

| F1 HELP | F2 | F3 LAST SCREEN | F4 PRINT THIS SCREEN | F5 | F6 SHUT DOWN SYSTEM |

FIG. 8B

NEW PROCESS OPERATING PARAMETERS

NEW IDENTIFICATION NAME OR NUMBER: _____ DATE _____
SELECT UNITS FOR TEMPERATURE AND PRESSURE MEASUREMENT
TEMPERATURE UNITS          PRESSURE UNITS

[X] Fahrenheit              [X] LBS/in2 (pounds per square inch)
[ ] Centigrade              [ ] Kg/cm2 (Kilograms per square centimeter)

PROCESS SET POINTS:
BAR TEMPERATURE: SET POINT: _____ UNITS: _____  DEVIATION LIMIT: +/- _____
PAD TEMPERATURE: SET POINT: _____ UNITS: _____  DEVIATION LIMIT: +/- _____
REVOLUTIONS PER MINUTE: _____ (Simulating packages per minute on production machine.)
SEALING BAR SIZE: _____ WIDE X _____ LONG = _____ SQUARE _____ (Units)

[X] SINGLE SEAL OPERATION          [ ] MULTIPLE SEAL OPERATION

SINGLE SEALING CYCLE
SEALING PRESSURE: _____ per square _____
DWELL TIME: _____ SECONDS.

[X] ADJUST FOR CONSTANT PRESSURE     [ ] HOLD INITIAL SEAL BAR POSITION

| [F1] HELP | [F2] NEXT SCREEN | [F3] LAST SCREEN | [F4] PRINT THIS SCREEN | [F5] TO SOFTWARE SELECT SCREEN | [F6] SHUT DOWN SYSTEM |

FIG. 8C

PROCESS OPERATING PARAMETERS

IDENTIFICATION NAME OR NUMBER _____ DATE _____

PROCESS SET POINTS:

BAR TEMPERATURE: SET POINT: _____ UNITS: _____ DEVIATION LIMIT: +/- _____
PAD TEMPERATURE: SET POINT: _____ UNITS: _____ DEVIATION LIMIT: +/- _____
REVOLUTIONS PER MINUTE: _____ (Simulating packages per minute on production machine.)
SEALING BAR SIZE: _____ WIDE X _____ LONG = _____ SQUARE _____ (Units)

[ ] SINGLE SEAL OPERATION      [X] MULTIPLE SEAL OPERATION

MULTIPLE SEAL CYCLES

SECONDS BETWEEN SEALER CONTACTS: _____
PRESSURE SETTINGS :( ) 1st = _____ 2nd = _____ 3rd = _____
DWELL TIME SETTINGS: (sec.) 1st = _____ 2nd = _____ 3rd = _____

[X] ADJUST FOR CONSTANT PRESSURE    [ ] HOLD INITIAL SEAL BAR POSITION

| F1 HELP | F2 NEXT SCREEN | F3 LAST SCREEN | F4 PRINT THIS SCREEN | F5 TO SOFTWARE SELECT SCREEN | F6 SHUT DOWN SYSTEM |

OPERATING DISPLAY SCREEN - SINGLE SEAL CYCLE

OPERATOR: _____ Date: _____ Time: _____
BAR TEMPERATURE: ACTUAL: _____ SET POINT: _____ DEVIATION LIMITS: +/- _____
PAD TEMPERATURE: ACTUAL: _____ SET POINT: _____ DEVIATION LIMITS: +/- _____
DWELL TIME SETTING: _____ Sec. REVOLUTIONS PER MINUTE: _____
PRESSURE SETTING: _____

POWER CONTROL: HEATERS [F9] ON [F9] OFF    MOTOR DRIVE [F9] ON [F10] OFF

BATCH IDENTIFICATION: _____

SAMPLE NUMBER: _____    SAVE DATE TO ACCUMULATE [F9] YES [F10] NO

PREVIOUS CYCLE DWELL AND PRESSURE GRAPH

```
Pressure  80
Units     70
          60
          50                    TEMPERATURE NOT READY TO OPERATE
          40
          30
          20
          10
           0
             0 .2 .4 .6 .8 1.0 1.2 1.4 1.6 1.8 2.0 2.2 2.4 2.6 2.8 3.0 3.2 3.4 3.6 3.8 4.0 4.2 4.4
                                    Time - seconds.
```

PEAK PRESSURE: _____        AVERAGE PRESSURE: _____

[F1] STORE THIS PROCESS  [F2] NEXT SCREEN  [F3] LAST SCREEN  [F4] PRINT THIS SCREEN  [F5] TO SOFTWARE SELECT SCREEN  [F6] SHUT DOWN SYSTEM

FIG. 8F

ACCUMULATED SEALING CONDITIONS

PROCESS IDENTIFICATION: _____  OPERATOR: _____
MATERIAL BATCH IDENTIFICATION: _____  NO. OF SAMPLES: _____

PROCESS SET POINTS:

SEALING BAR TEMPERATURE: _____  SEALING PAD TEMPERATURE: _____
DWELL TIME, 1ST: _____ Sec., 2ND: _____ Sec., 3rd: _____ Sec.
SEALING BAR SIZE, WIDTH: _____  LENGTH: _____  AREA: _____
SEALING PRESSURE, 1ST: _____ 2ND: _____ 3RD: _____ PER SQ. _____

REVOLUTIONS PER MINUTE (Simulating packs per minute) _____
SECONDS BETWEEN SEALER CONTRACTS: _____

BATCH VARIATIONS:  DATE / TIME _____

TEMPERATURE HIGH / LOW POINT: SEAL BAR: ___ / ___, SEALING PAD: ___ / ___
AVERAGE DWELL:    1ST: _____ Sec., 2ND: _____ Sec., 3RD: _____ Sec.
SHORTEST DWELL: 1ST: _____ Sec., 2ND: _____ Sec., 3RD: _____ Sec.
LONGEST DWELL:   1ST: _____ Sec., 2ND _____ Sec., 3RD: _____ Sec.
AVERAGE PRESSURE: 1ST: _____ 2ND: _____ 3RD: _____
MINIMUM PRESSURE: 1ST: _____ 2ND: _____ 3RD: _____
MAXIMUM PRESSURE: 1ST: _____ 2ND: _____ 3RD: _____

| F1 STORE THIS PROCESS | F2 NEXT SCREEN | F3 LAST SCREEN | F4 PRINT THIS SCREEN | F5 TO SOFTWARE SELECT SCREEN | F6 SHUT DOWN SYSTEM |

FIG. 8G

ACCUMULATED SEALING CONDITIONS

PROCESS IDENTIFICATION: _____ OPERATOR: _____
MATERIAL BATCH IDENTIFICATION: _____ NO. OF SAMPLES: _____

PROCESS SET POINTS:

SEALING BAR TEMPERATURE: _____ SEALING PAD TEMPERATURE: _____
DWELL TIME: _____ SECONDS
SEALING PRESSURE: _____ PER SQUARE AREA: _____
SEALING BAR SIZE, WIDTH: _____ LENGTH: _____ AREA: _____

_____ REVOLUTIONS PER MINUTE (Simulating packs per minute)

BATCH VARIATIONS: DATE / TIME _____

TEMPERATURE HIGH / LOW POINT: SEAL BAR: ___ / ___ , SEALING PAD: ___ / ___
AVERAGE DWELL: _____ SEC.
SHORTEST DWELL: _____
LONGEST DWELL: _____
AVERAGE PRESSURE: _____ PER SQUARE
MINIMUM PRESSURE: _____
MAXIMUM PRESSURE: _____

| F1 STORE THIS PROCESS | F2 NEXT SCREEN | F3 LAST SCREEN | F4 PRINT THIS SCREEN | F5 TO SOFTWARE SELECT SCREEN | F6 SHUT DOWN SYSTEM |

FIG. 8H

COMPUTER CONTROLLED HEAT-SEALING MACHINE

This application is a division of Ser. No. 07/881,288 filed May 11, 1992 now U.S. Pat. No. 5,322,586.

TECHNICAL FIELD

The present invention relates generally to apparatus for testing the integrity of a fusible packaging material under predetermined operating parameters such as time, temperature and pressure, and, more particularly, to a computer controlled heat-sealing machine wherein at least one of the parameters is actively controlled during sealing.

BACKGROUND ART

In the film packaging industry, packaging machines are used to form a pouch of a fusible film material which is filled with a bulk liquid or solid material. Subsequently, overlapping edges of the fusible films defining an open end through which filling occurs are heated between top and bottom sealing jaws to generate a continuous long seal.

A good seal is necessary to prevent any of the packaged material from leaking or falling out before it reaches the consumer and before it is ready for actual use. Another reason for ensuring good seals in film wrappers is that the wrapper is sometimes utilized as a protective cover and prevents elements outside of the package from reaching the material within. Defective seals depreciate the quality of the protection offered by the wrapper or may completely destroy the sanitary or other desired atmospheric conditions within the package.

Although good seals are readily appreciated within the industry, the actual time, temperature and pressure conditions under which a particular fusible film will seal is not readily appreciated by a packaging machine operator until a production packaging machine has been set to particular temperature and pressure conditions for actual production and seals are made. This may entail considerable set-up time and inspection of the seals to determine that reliable heat sealing is occurring and it may be necessary to re-set the machine during this set-up process if good heat seals are not being obtained.

It is accordingly one object of the present invention to provide a heat-sealing machine which simulates and monitors the actual temperature and pressure acting upon a fusible film through the top and bottom sealing jaws during the sealing cycle to provide a packaging machine operator with assurance that particular pressure and temperature operating parameters, at a selected simulated operating speed of a production packaging machine, will form high quality seals.

Another object of the invention is to allow for computer control of such a heat-sealing machine so that the operating parameters are easily programmable or re-programmable.

Another object is to provide a heat-sealing machine wherein at least one of the various operating parameters, and preferably all of the various operating parameters, can be continuously controlled during the sealing cycle and displayed either on computer screen or through hard copy.

Still another object is to provide assemblies and mechanisms as well as sensing and logic circuitry which may be embodied in production packaging or heat-sealing machines to monitor and self regulate selected temperature and pressure conditions during actual production.

DISCLOSURE OF THE INVENTION

Apparatus for heat-sealing together portions of a fusible film or coated material, in accordance with the present invention, comprises a pair of sealing jaws movable into and out of clamping engagement with the fusible film. At least one of the jaws includes a heating element to fuse the clamped portions to form a heat seal. A pressure sensor senses clamping pressure during a sealing dwell period when the jaws are in clamping engagement with the portions and a control arrangement, responsive to the pressure sensor, monitors and adjusts the clamping pressure throughout substantially the entire sealing dwell period to maintain it at a preselected level.

The pressure sensor preferably includes a load cell mounted to support the weight of one of the jaws together with any loaded weight imposed thereon. The second jaw is preferably reciprocated into contact with the first jaw mounted to the load cell through a linkage connected to an eccentric shaft controlled by a servo or stepper motor.

In the preferred embodiment, the eccentric shaft includes a pair of eccentric portions and the linkage includes a first pair of link arms, common ends of which are respectively mounted to the eccentric portions. The other, opposite ends of the first link arms are connected to a second pair of link arms intermediate opposite ends thereof. Common ends of the second arms are mounted to a machine frame for pivotal movement and the opposite ends of the second arms are mounted to the second sealing jaw. Rotation of the eccentrics through a predetermined angle towards the bottom dead center (BDC) position causes the second jaw to be moved into pressure contact with the first jaw or fusible material therebetween through the first and second linkages.

The control arrangement preferably includes an encoder mounted to the eccentric shaft for measuring the precise angular position of the eccentrics between the top and bottom dead centers. The pressure sensed by the load cell at said precise angular position is compared with the preselected pressure and the angular positions of the eccentrics can thereby be constantly adjusted throughout the sealing dwell period to attain the preselected pressure as said sensed pressure.

The second and first sealing jaws are respectively mounted to top and bottom seal bar assemblies disposed within the apparatus. The bottom seal bar assembly includes a support link connected to a machine frame of the apparatus. The load cell is mounted to the support link to support a support bar provided with a bottom seal pad on which the fusible film is to be positioned.

More specifically, the support bar is connected to the load cell through a clamping block arrangement. A pivot pin interconnects the support bar to the clamping block. The pivot pin is preferably the sole source of attachment of the support bar to the load cell and extends through the center of gravity of the support bar. Compression springs, extending between the support link and the support bar on opposite sides of the pivot pin, may be provided for resiliently balancing the support bar on the support link.

In accordance with another feature of the present invention, the load cell and support link may be of unitary construction, either for use in the heat-sealing machine of the present invention or as a load cell capable of other applications as will be appreciated by one of ordinary skill in the art from a review of this disclosure. The support link is divided into an upper portion and a lower portion by a thin, generally horizontally oriented cavity extending through a major portion of the length of the supporting link between opposite ends thereof. The upper portion functions as a load cell and the lower portion functions as a supporting portion therefor. The upper portion includes a central load-bearing portion having a horizontally extending, upwardly directed surface adapted to receive a layer of thermally isolating material thereon. A layer of shim stock may be placed on the thermal isolating material and the support bar of the bottom seal assembly is adapted to rest on one of the top surfaces of the load-bearing portion, the thermal isolating material, or the shim stock so that the entire weight and loading thereon of the support bar is transmitted to the load-bearing portion.

The opposite ends of the load-bearing portion are each interconnected to the opposite end portions of the support link through a pair of thin deflection beams. More specifically, a pair of intermediate bridging portions are respectively formed at opposite ends of the load-bearing portion to which intermediate portions the load-bearing portion is connected through the top and bottom beams. The load-bearing portion is thus suspended above the dividing cavity and totally supported by the intermediate portions through each set of top and bottom beams. The intermediate portions also overlie the dividing cavity and each intermediate portion includes a vertically extending deflection compensating slot which opens at the bottom thereof into the dividing cavity and terminates at its upper closed end adjacent the top surface of the intermediate portion. The slot permits deflection of the top and bottom beams during loading. Strain gauges are disposed on surfaces of each of the top and bottom beams to measure loads imposed thereon.

The top surface of each intermediate portion is a horizontal flat surface located elevationally above the top surface of the load-bearing portion and is adapted to be spaced downwardly from a bottom surface of the bottom seal pad support bar through appropriate selection of shim stock so that the resulting gap therebetween limits the extent to which the top and bottom beams may deflect under load.

In accordance with a further aspect of the load cell of the invention, two pairs of second sets of top and bottom beams respectively interconnect the intermediate portions and thereby the load-bearing portion to the lower supporting portion of the support link through the end portions thereof. Each second set of top and bottom beams also overlies the thin, elongate dividing cavity. The second beam sets are thicker than the first beam sets, whereby pressure may be measured in high and low pressure ranges with the first beam sets providing low pressure measurements until such time as the bottom support bar contacts the top surface of the intermediate portions. This contact prevents stressing the low pressure beams beyond their yield point and allows the heavier beams to continue deflecting to measure the load through their strain gauges. The second beam sets are then deflectable into the dividing cavity to provide measurements of high pressures within a higher pressure range. The microprocessor accumulates data from all eight strain gauges throughout any sealing cycle and produces the total force measurement by selecting the signals from the four strain gauges which fit the load and give the highest resolution.

A method of heat-sealing together portions of a fusible film material is also disclosed. The method comprises the steps of preselecting one or more operating parameters under which a pair of sealing jaws are adapted to be maintained in clamping engagement for a predetermined sealing dwell period. Said parameter(s) is monitored during the sealing dwell period and the jaws are adjusted to maintain the parameter(s) at its predetermined level during the sealing dwell.

Preferably, the clamping pressure of the sealing jaws is adjusted and maintained at the preselected level. Clamping pressure is achieved by pivoting one of the sealing jaws into and out of clamping engagement with the other jaw through a stepper motor or a servo motor operating an eccentric shaft connected to the jaw through a linkage mechanism. In accordance with the invention, the precise angular position of the eccentric shaft is measured between top and bottom dead center positions; the sensed clamping pressure is compared with the preselected clamping pressure and the angular position of the eccentric shaft is adjusted during sealing dwell to attain the preselected clamping pressure as the sensed pressure.

The invention comprises the further step of controlling the speed at which the eccentric shaft is rotated into a preselected angular position adapted to correspond with the preselected pressure so as to simulate a programmed and preselected production speed at which the sealing jaws are brought together in a production machine.

The clamping pressure is preferably monitored with a load cell operatively connected to the other of the sealing jaws. During initial start-up of the machine, the sealing jaw is moved under slow motor rotation until the load cell indicates contact between the sealing jaws. The motor is then reversed to locate the top dead center position of the eccentric shaft. An iterative, auto tune sequence is then initiated to enable the eccentric shaft to repeatedly rotate into selected angular positions to locate a particular angle corresponding to the preselected clamping pressure. In this manner, the machine tunes itself so that the shaft is rotatable at a selected target RPM directly to that particular angular position to obtain the preselected clamping pressure.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 6 is a side elevational view of the top seal bar assembly of FIG. 5;

FIGS. 8B-8H are subsequent computer display screens used to program selected operating parameters and display the conditions under which single or multiple seals occur during testing or production;

FIG. 11 depicts the load cell of FIG. 9 under load.

BEST MODE FOR CARRYING OUT THE INVENTION

Figure 1:
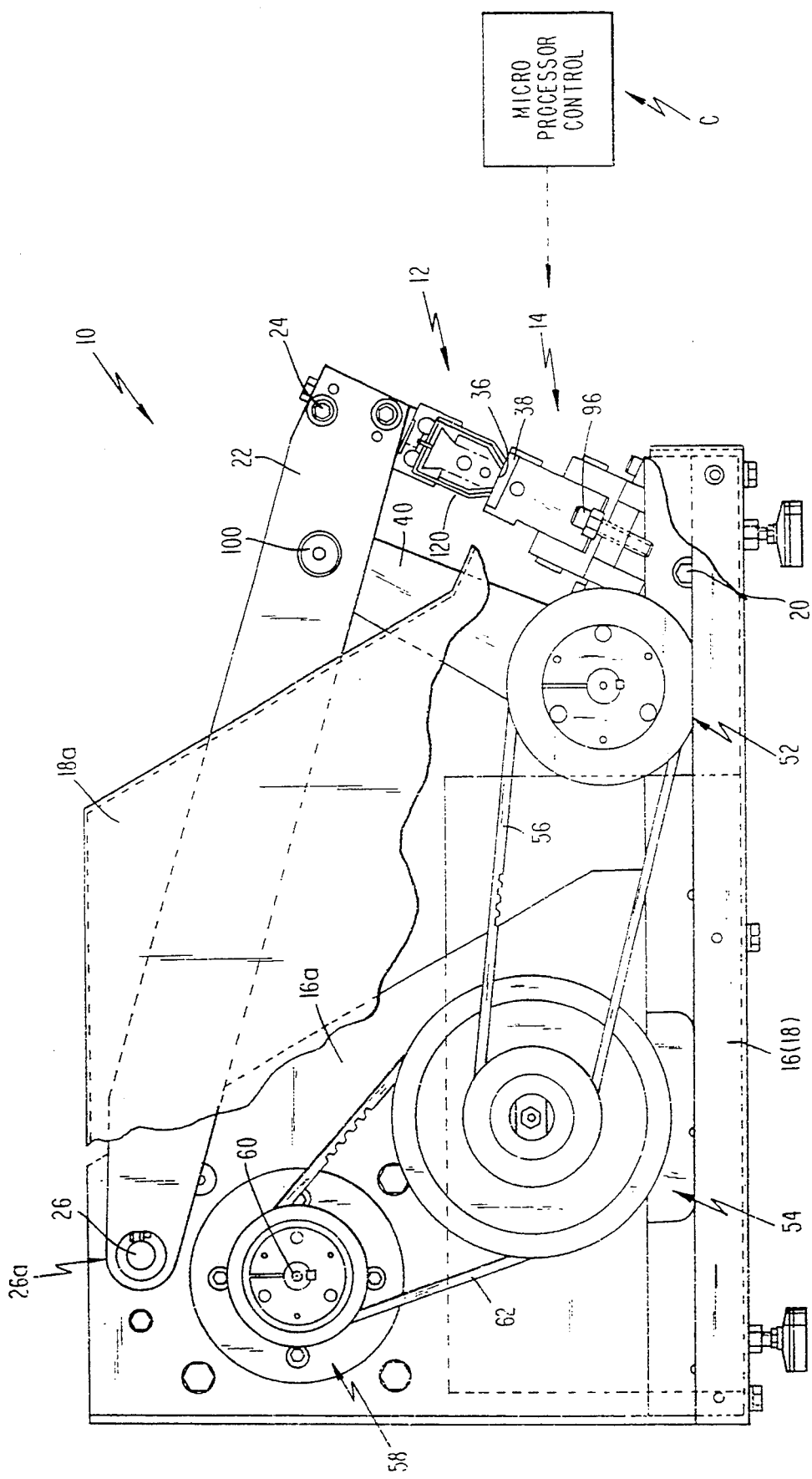
FIG. 1 is a side elevational view of a heat-sealing machine constructed in accordance with the principles of the present invention.

FIG. 1 is a side view of a heat-sealing machine 10 comprising a top seal bar assembly 12 pivotally movable into heat-sealing contact with a bottom seal bar assembly 14 to apply heat and pressure to overlapping films of fusible film material or materials with heat-sealable coatings adapted to be inserted therebetween. Such films (not shown) may constitute the edges of side walls forming a pouch adapted to contain liquid or solid bulk material, wherein a good heat seal of these edges is crucial to prevent leakage of contents. The films of fusible material are well known, such as polyethylene, polypropylene, poly-foil-paper lamination, PVC and other materials. Each film, as a function of material type and production run from which the batch was made, seals under slightly different temperature and pressure conditions. In the presently preferred embodiment, heat-sealing machine 10 is a computer controlled bench top model which simulates and monitors the actual time, temperature and pressure acting upon the fusible film through the top and bottom sealing jaws 12,14 during the sealing cycle. This provides a quality assurance inspector or packaging machine operator with assurance that particular, preselected pressure and temperature operating parameters, at a selected simulated operating speed of a production packaging machine, will form high quality seals. As will be seen more fully below, various assemblies and mechanisms as well as sensing and logic circuitry may be embodied in production packaging or heat-sealing machines to monitor and self regulate temperature and pressure during actual production.

Figure 2:
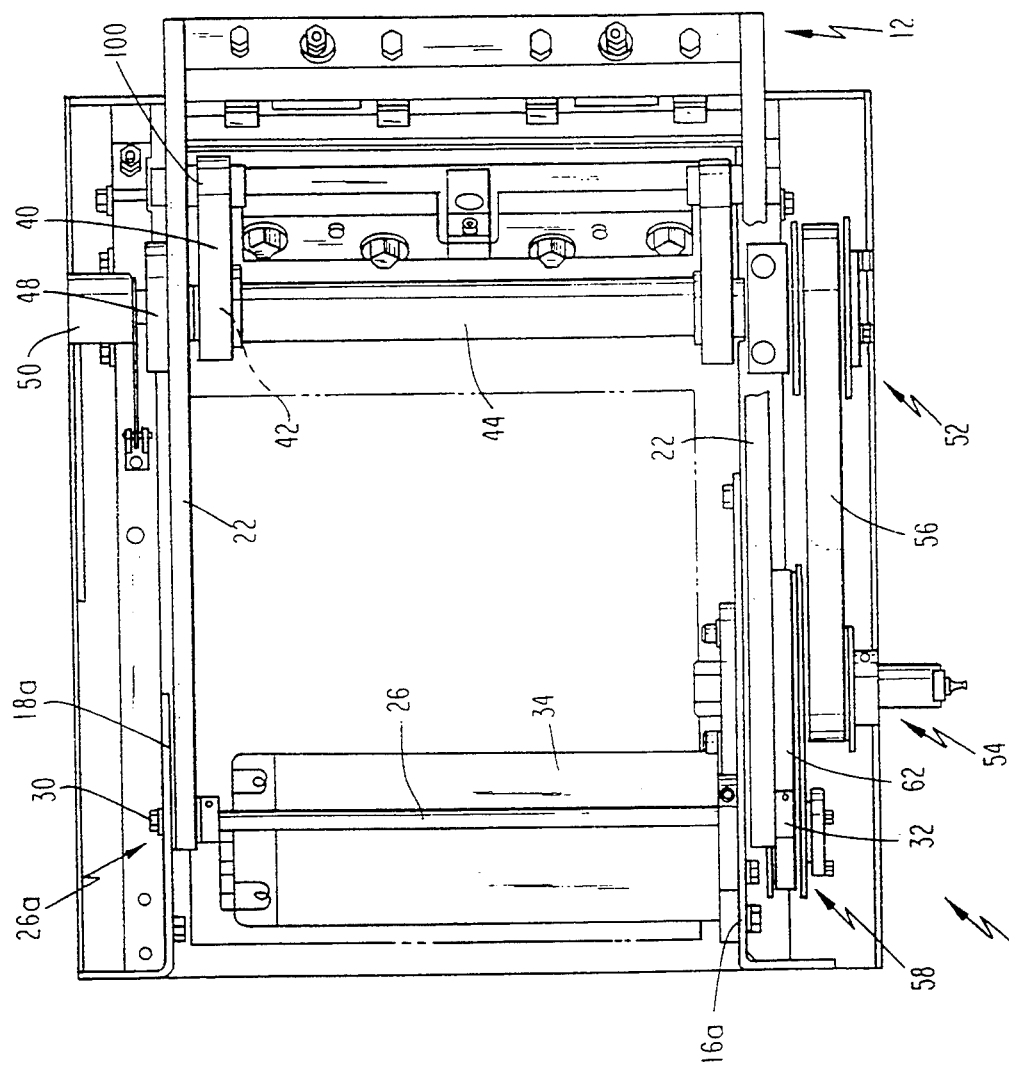
FIG. 2 is a top plan view of the machine depicted in FIG. 1.
Figure 3:
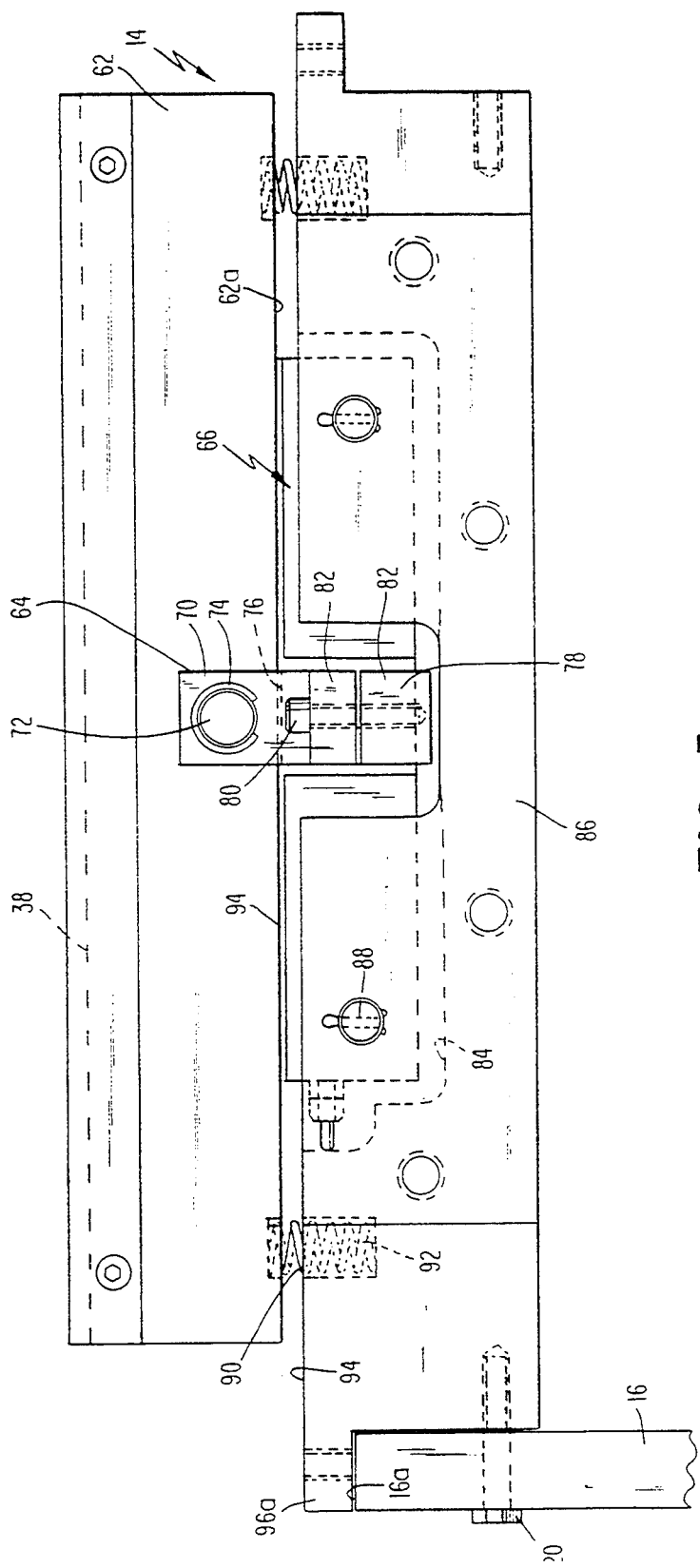
FIG. 3 is a front elevational view, partly schematic, depicting a bottom seal bar assembly of the present invention.
Figure 5:
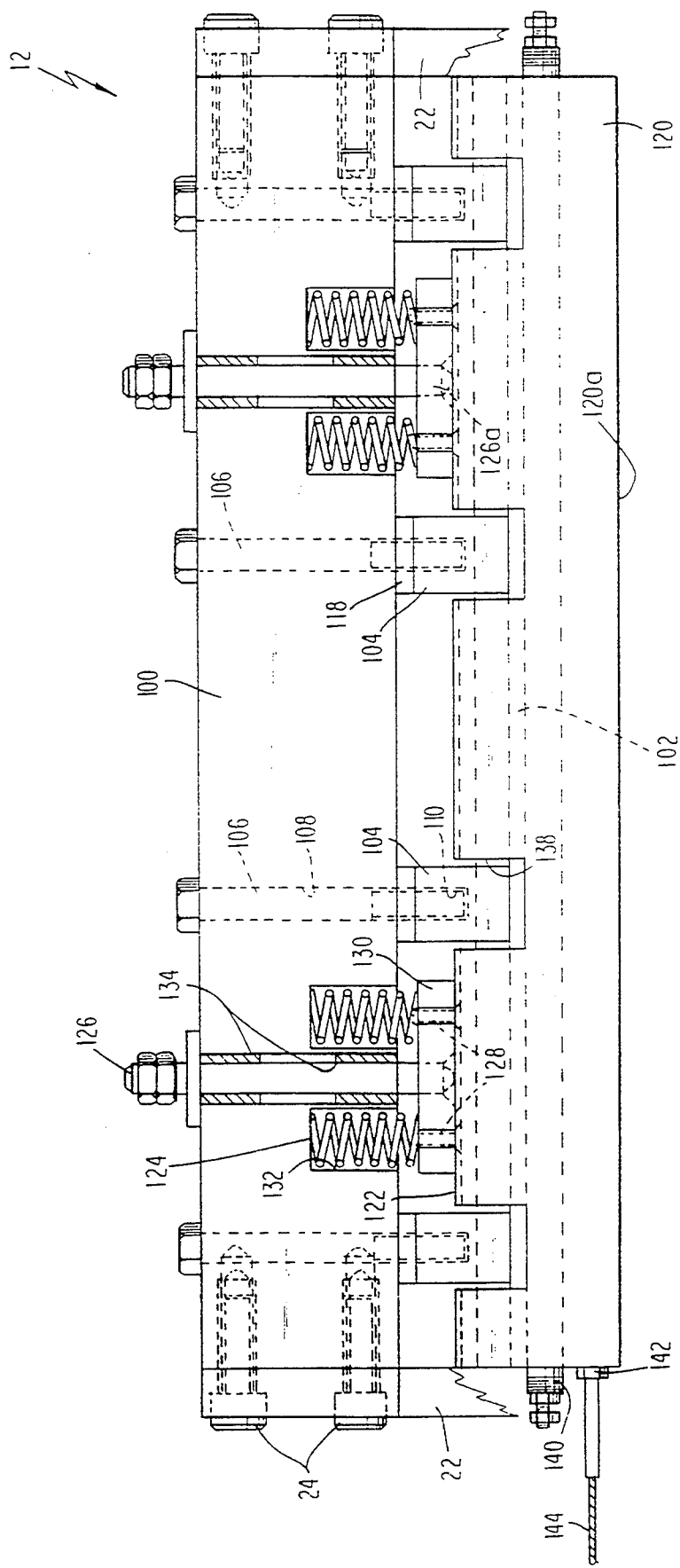
FIG. 5 is a front elevational view, partly sectional and partly schematic, depicting a top seal bar assembly of the present invention.

Heat-sealing machine 10 comprises a pair of left and right lower mounting frame rails 16 and 18 which respectively support parallel, upright side body members 16a and 18a as best depicted in FIGS. 1 and 2. The bottom seal bar assembly 14 extends between front end portions of the parallel frames 16,18 and is stationarily secured thereto with clamping screws 20 as best depicted in FIGS. 1 and 3. The top seal bar assembly 12 extends parallel to the bottom seal bar assembly 14 between front end portions of a pair of parallel link arms 22. The top seal bar assembly 12 is mounted to the link arms 22 with screws 24 respectively extending into opposite ends of the assembly as depicted in FIGS. 5 and 6. These link arms 22 extend upwardly and rearwardly from the top seal bar assembly 12 for pivotal connection to the side body members 16a,18a with a cross shaft 26 extending between the side body members and through the rear ends of the link arms. As depicted in FIG. 2, the right end of the cross shaft 26 is secured to the right side body member 18a with a clamp block 28 mounted on the cross shaft inwardly adjacent the link arm. A washer and screw 30 secure the cross shaft 26 to the side body member 18a. The left hand link arm 22 extends outwardly adjacent the left hand side body member 16a and is retained on the cross shaft 26 with an outwardly adjacent set collar 32.

Figure 7:
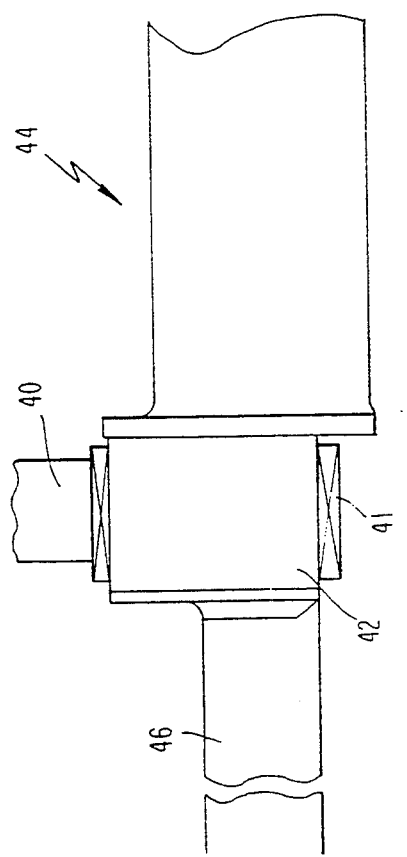
FIG. 7 is a front elevational view of an eccentric shaft used in the present invention.

Controlled pivotal movement of the top seal bar assembly 12 is uniquely accomplished through a linkage system operated by a servo motor 34 (or a stepping motor) which maintains accurate alignment between the mating top and bottom sealing pads 36 and 38. The linkage system comprises a pair of second link arms 40 respectively pinned at their upper ends to the front end portions of the first link arms 22 as at 100 in FIG. 1. The lower ends of the second link arms 40 are respectively rotatably journalled via bearings 41 to eccentric portions 42 of an eccentric shaft assembly 44 which is adapted to move the top sealing head 12 through desirable acceleration and deceleration profiles for smooth operation in the manner described below. With reference to FIGS. 2 and 7, the opposite ends 46 of the eccentric shaft assembly 44 are respectively journalled to the side body members 16a,18a with bearings 48. The lower ends of the second link arms 40 are respectively mounted to the eccentric portions 42 of the shaft assembly 44. An encoder 50 is mounted to the right hand, non-eccentric end 46 of the shaft assembly 44 to monitor the rotary position of the shaft as described more fully below. The left hand non-eccentric end 46 of the shaft 44 supports a sprocket assembly 52 as best depicted in FIGS. 1 and 2. This sprocket assembly 52 is rotatably driven by a second sprocket assembly 54 mounted to the left side body member 16a rearwardly adjacent the first sprocket assembly 52 through a polychain belt 56. This second or intermediate sprocket assembly 54 is rotatably driven by the servo motor 34 through an output sprocket assembly 58 on the output shaft 60 thereof through another polychain belt as best depicted in FIG. 1.

Figure 7A:
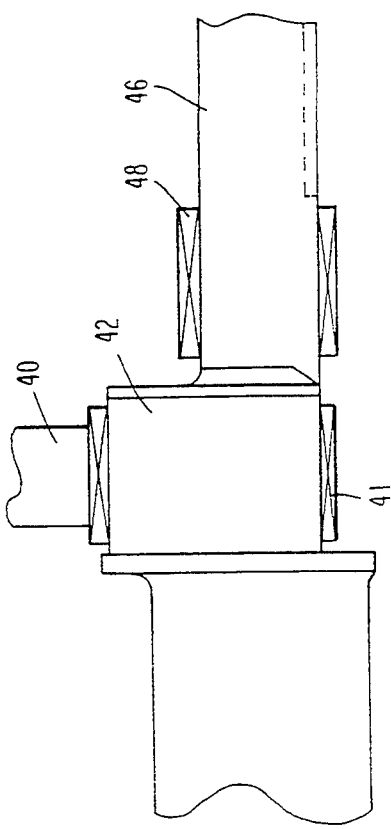
FIG. 7A is a side elevational view of the eccentric shaft of FIG. 7 depicting eccentrics of the shaft in a solid line top dead center (0°) position and a bottom dead center (180°) position depicted in phantom line.
Figure 7A:
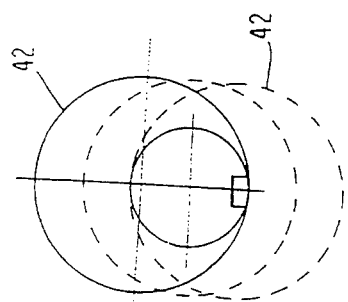

Incremental rotation of the servo motor output shaft 60 in the manner described more fully below imparts rotational movement to the eccentrics 42 through the timing belt driven sprockets 58,54,52 and this in turn lowers and raises the top seal bar assembly 12 into and out of sealing contact with the bottom seal bar assembly 14 through pivotal movement of the first link arms 22 about their rear fulcrums 26a which is induced by the second link arms 40 being correspondingly lowered and then raised by the eccentrics 42. The second link arms 40 and the eccentric shaft 44 thus act as a crankshaft mechanism and the speed of crankshaft movement, as controlled by the servo motor 34, simulates production speed since it directly controls the impact speed of the top sealing bar 12 on the film material. The sealing pressure between the top and bottom sealing bars 12,14 is controlled by the degree of angular rotation of the eccentrics 42 between top and bottom dead center positions. The top dead center position is best depicted in solid line in FIG. 7A and the bottom dead center position in dotted line.

Figure 4:
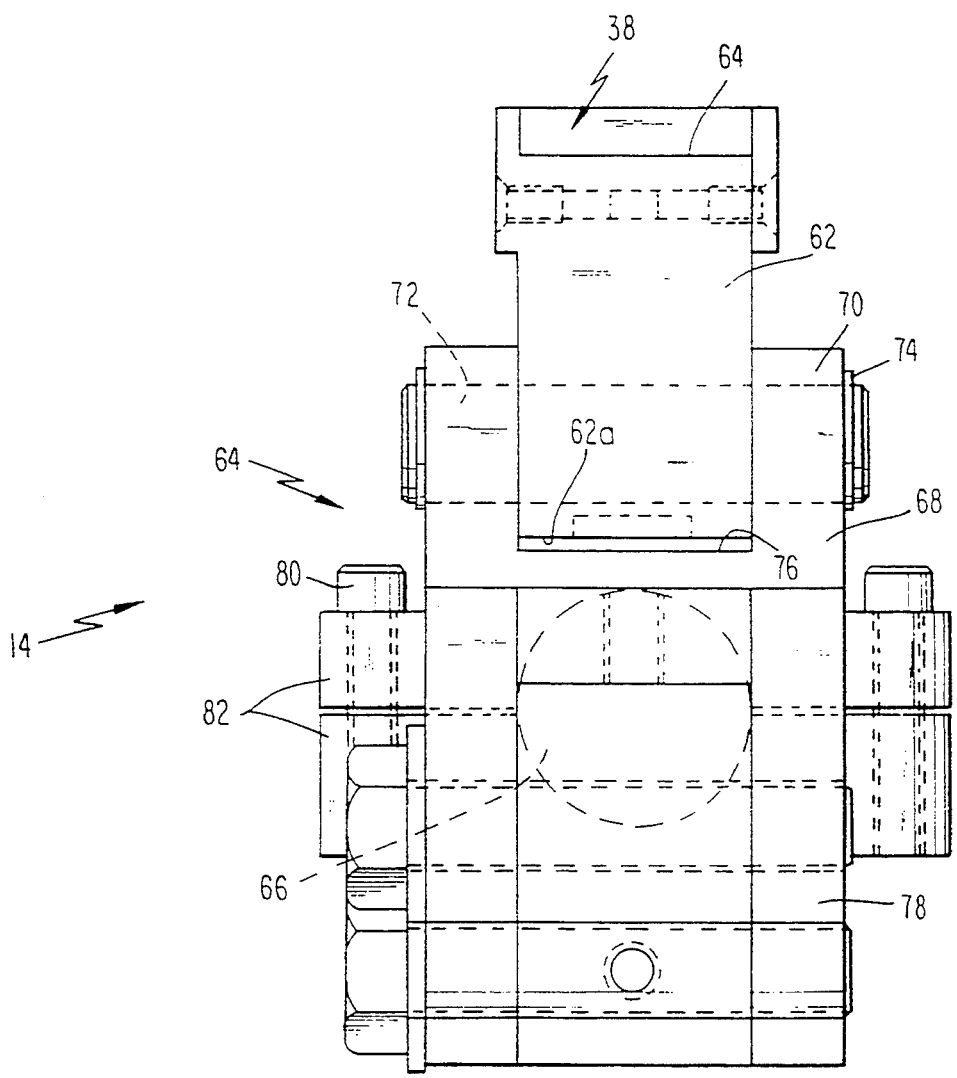
FIG. 4 is a side elevational view of the bottom seal bar assembly of FIG. 3.

FIGS. 3 and 4 are front and side elevational illustrations of the bottom seal bar assembly 14, respectively. With reference to FIG. 3, the bottom seal bar assembly 14 comprises a support bar 62 formed with an upwardly directed channel 64 receiving the bottom seal pad 38 along the entire length thereof. The bottom seal pad support bar 62 is pivotally supported on a clamp block assembly 64 mounted to a load cell 66. More specifically, with reference to FIG. 4, the top half 68 of clamp block assembly 64 is formed with a pair of upright parallel mounting ears 70 receiving an intermediate portion of the support bar 62 therebetween. A pivot pin 72 extends through coaxially aligned openings in the mounting ears 70 and the support bar 62 and is retained therein with shaft retaining rings 74 respectively mounted to opposite ends of the pivot pin which project from outer surfaces of the ears. The bottom surface 62a of the support bar 62 is spaced upwardly from the upwardly directed surface 76 of the top clamping block 68 between the mounting ears 70 so that the bottom seal bar rests solely on the pivot pin 72 to transmit load directly to the load cell 66.

The top half 68 of the clamping block 64 is mounted to the bottom half 78 with a pair of clamping screws 80 threadedly extending through aligned openings in opposing clamping projections 82 in the top and bottom halves. In this manner, the load cell 66 is clamped between the halves 68,78 so that any load imposed on the bottom seal bar assembly 16 (62) is transmitted directly to the load cell.

The load cell 66 is mounted within an upwardly directed cavity 84 formed in the top surface of a support link 86 connecting the bottom seal bar to the machine frame 16 as best depicted in FIG. 3. A pair of support pins 88 extending entirely through the width of the support link 86 are used to mount the load cell 66 within the cavity 84 with the weight of the bottom seal bar 62 acting directly on the load cell 66 through the clamping blocks 64 as mentioned above. A pair of compression springs 90 received in blind bores 92 in the top surface 94 of the support link 86 project upwardly into contact with the bottom surface 62a of the support bar 62 to resiliently support the bar from the support link. The support link 86 is then mounted to the bottom support frames 16 with the clamping screws 20 as mentioned above. A pair of leveling screws 96 extend downwardly through the outermost ends 96a of the support link 86 into abutting contact with the top edge 16a of the bottom frames 16 to enable leveling of the support link relative to the machine frame.

The top seal bar assembly 12 is supported in operative alignment with the bottom seal bar assembly 14 by the front end portions of the first link arms 22 as described above. With reference to FIGS. 5 and 6, the top seal bar assembly 12 includes a mounting bar 100 extending horizontally between the first link arms 22 for securement thereto with fastening screws 24. The top seal bar 102 is interconnected to the mounting bar 100 through a plurality of mounting shoes 104 mounted at longitudinally spaced intervals to the mounting bar through screws 106 inserted into through bores 108 through the top of the mounting bar. These screws 106 project downwardly from the bottom surface of bar 100 for threaded insertion in a blind bore 110 in the top surface of the associated shoe 104.

As best depicted in FIG. 6, each shoe 104 is of generally rectangular cross-section with an inverted trapezoidal shaped channel 112 in the bottom surface 114 thereof. The top portion 114 of the top seal bar 102 is formed with a correspondingly shaped inverted trapezoidal portion which is slidingly received in each of the mounting channels 112 of the shoes 104 to achieve an interlocking dovetail joint fit. Tightening of the mounting screws 106 "pinches" the lower side portions 116 of each mounting shoe 104 (defining the tapered sides of the mounting channel 112) into tightening contact with the top seal bar 102 at 114. These side portions 116 thus act as mounting jaws for securing the top seal bar 102 to the mounting shoes 104. Loosening of the screws 106 relaxes the jaws 116 to release the top seal bar 102 from the mounting shoes 104 such as for replacement or repair.

The mounting shoes 104 are preferably formed from a material such as stainless steel which has low thermal conductivity and acts as thermal isolators between the mounting bar 100 and top seal bar 102. Insulation spacers 118 are also provided between each mounting shoe 104 and the mounting bar 100 to improve thermal isolation.

A clamp shield 120 extends the entire length of the top seal bar 102 to prevent inadvertent operator contact with the heated seal bar and reduce radiation heat loss. As best depicted in FIG. 6, clamp shield 120 is of inverted U-shaped cross-section wherein the bight portion 122 is resiliently attached at two longitudinally spaced locations to the mounting bar 100 by means of a pair of compression springs 124 and an attachment bolt 126 at each location. More specifically, with reference to FIG. 5, a pair of screws 128 are used to attach the bight portion 122 to a rectangular mounting guide block 130 positioned between the clamp shield 120 and bottom surface of the mounting bar 100. Each pair of compression springs 124 projects downwardly from blind bores 132, formed in the mounting bar bottom surface, into resiliently biased contact with the top surface of the mounting block 130. The lower end 126a of the attachment bolt 126 is welded to the mounting block 130 and slidable within a sleeve bearing 134 disposed in the mounting throughbore through which the bolt extends in the mounting bar 100. In this manner, as the top seal bar assembly 12 descends into heat-sealing contact with the bottom seal bar assembly 14, as depicted in FIG. 1, the clamp shield 120 is deflected resiliently upwardly against the bias of the compression springs 124 as the bottom edges 120a of the clamp shield 120 contact the bottom seal pad 38. As the top seal bar assembly 12 is pivoted out of contact with the bottom seal bar assembly 14 after heat-sealing, the spring bias deflects the clamp shield 120 downwardly below the top seal bar heated surface 36 as depicted in FIGS. 5 and 6.

The upper portion of the clamp shield 120 is formed with cutouts 138 to respectively receive the associated mounting shoes 104 accommodated therein as depicted in FIG. 5.

The clamp shield 120 for the top sealing jaw 102 thereby functions as a protective, reflective shield which clamps material to the bottom sealing pad 38 prior to sealing pressure. It also reduces the possibility of incidental finger contact and resulting burns. The polished interior surface of the shield 120 also reduces radiated heat and improves heater efficiency.

A heating element 140 extends through the entire length of the top seal bar 102 along a lower portion thereof to heat the thermally conductive seal bar to a desired temperature. This temperature is monitored by a thermocouple or resistance temperature device (RTD) assembly 142 connected by wire 144 to a computer controlled temperature controller 146 to which the heating element 140 is also connected as is well known. The heat sealer assembly 10 described hereinabove may be operator controlled through controller software in a personal computer such as manufactured by Intel Corporation and preferably containing an 80386 processor and a 80387 math co-processor operating at 20 or more megahertz, four Megs of ram, 3½ inch high density 1.44 Meg FLOPPY and 80 plus Meg HARD DRIVE are provided with a 14 inch color VGA display monitor. A standard keyboard is provided. For process control, a real time operating system may be used, such as the RMX III by Intel Corporation. MS-DOS software can be provided for data and word processing. Networking is optional.

The temperature sensor 142 may be of the RTD type, three wire, 100 ohms ±0.1 ohm at 0° C. Alpha:00392 ohms/ohms per °C. The load cell 66 measuring pressure in the bottom seal bar assembly 14 may be of the shear beam type, maximum load 2,500 pounds, Part No. 65016-2.5K such as made by SENSORTRONICS, Covina, Calif.

The rotational movement of the eccentric shaft 44 which moves the top sealing head 12 through the linkage system 22,40 operated by the servo motor 34 is monitored by an incremental optical rotary encoder 50, such as Model No. 152-111-1024-48S made by Dynamics Research Corporation, Wilmington, Mass.

The computer provides timing for the sealer dwell times from 0 to 30 seconds by 0.10 second increments.

The operations described hereinbelow which are controlled as a result of the above-identified sensing devices may be controlled through an analog device I/O (input/output) board as well known in the art.

As mentioned above, the primary purpose of the bench top heat-sealing machine 10 of this invention is for quality assurance operations so that specific test sealing conditions can be programmed and preserved. This allows repeatable periodic tests for specific customer conditions to measure sealing limits and acceptability. It will be appreciated that the data accumulated in real time sealing operations can be transferred to common MS-DOS software for convenient analysis.

Figure 8A:
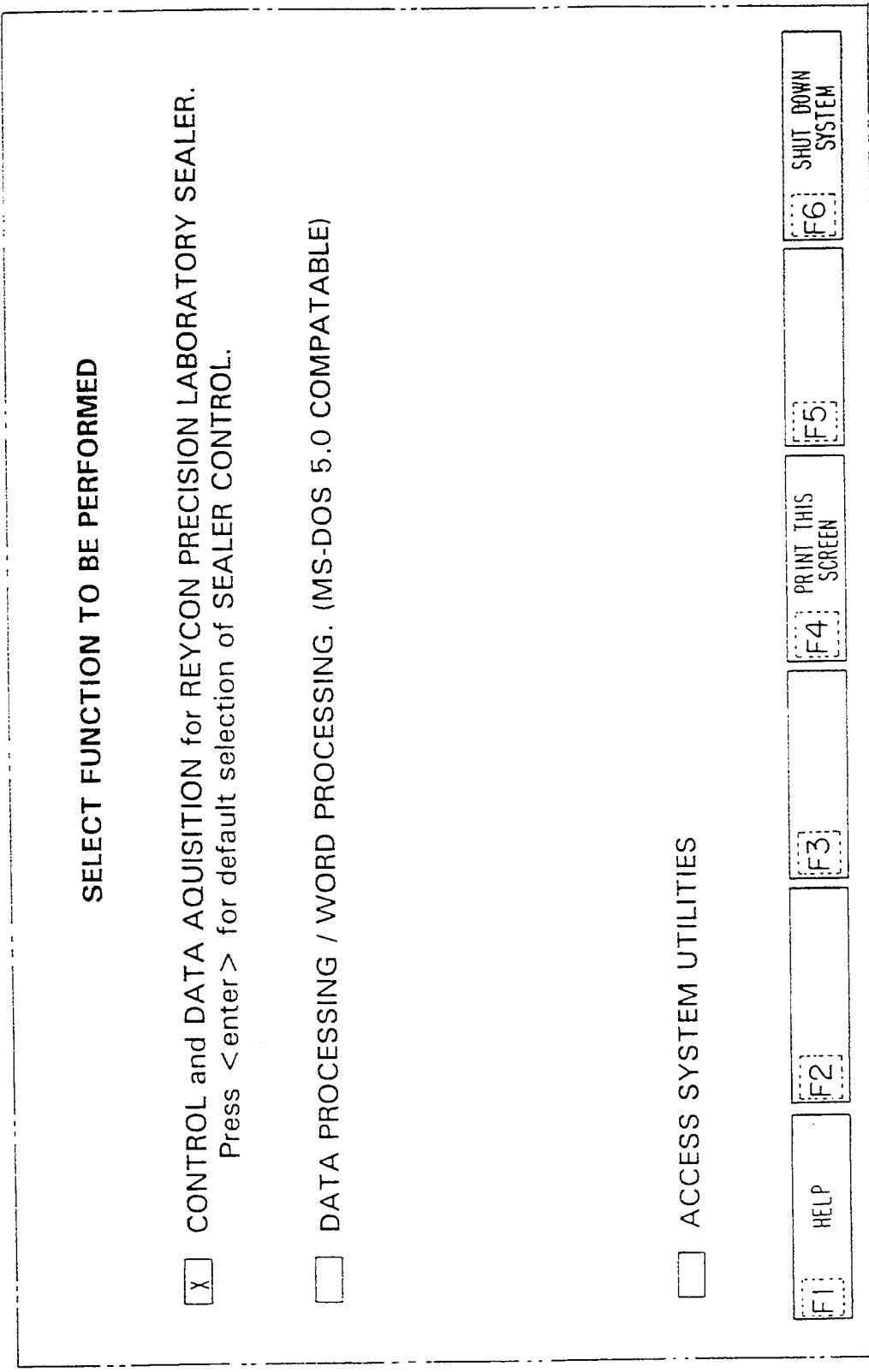
FIG. 8A is a representative depiction of a computer screen display achieved with the software used to operate the hardware of the present invention.

When it is desired to heat-seal two fusible films together, the heat-sealing machine 10 and the personal computer (microprocessor) C are actuated. Advantageously, the bench top embodiment described hereinabove requires only 115 volts AC. After logging on, a first menu screen as depicted in FIG. 8A allows the user to either select a data processing or word processing function, or to proceed to a control and data acquisition mode for the heat-sealer of this invention.

FIG. 8B is a screen for enabling the user to either select an existing process to be run as depicted in FIG. 8C or to write a new process as depicted in FIG. 8D. These parameters include sealing bar and pad temperatures, speed of crankshaft (which affects impact of the sealing bar 102 on the material to simulate the number of packages per minute being sealed on a production machine), sealing dwell time and pressure during sealing. The system advantageously allows for simulation of multiple seals at different dwells and different pressures to simulate multiple station sealing operations on high speed production lines. It will be appreciated that the parameters are entered either through keyboard or mouse from the above menu screens which allow for adjustable computer controlled operating parameters for reliable, repeatable sealing conditions.

It will be further understood that the computer software allows the operator to select either American pounds and inches or to utilize the metric system for the control parameters and documentation. The computer software allows the operator to select sealing pressure in pounds per square inch or kilograms per centimeter squared. The operator may also enter the length and width of the sealing bar surface 36 and the computer software calculates the area and uses that area calculation to adjust total pressure for desired pounds per square inch. Likewise, the software may provide access security if needed to prevent unauthorized use. Safety is improved since the operators can be trained before they are given access to running the machine.

Once the process parameters have been inputted into the system with the pad pressure selected and/or adjusted by the microprocessor C during initial start-up, the system is automatically calibrated to produce accurate pad pressures. As mentioned above, the pad pressure is determined by the rotary position of the eccentric shaft 44 between the top dead center (TDC) position depicted in FIG. 7A and the bottom dead center (BDC) position depicted in dotted line. In the top dead center position, the crankshaft linkages 22,40 have pivoted the top seal bar assembly 12 to its uppermost position out of contact with the bottom seal bar assembly 14. In the bottom dead center position, the crankshaft linkage 22,44 has pivoted the top seal bar assembly 12 into its bottommost sealing position against the bottom seal bar assembly 14 where maximum pressure is applied. This maximum pressure may be adjusted by raising or lowering the bottom seal bar assembly support link 86 through the leveling screws 96 as discussed supra.

Figure 7B:
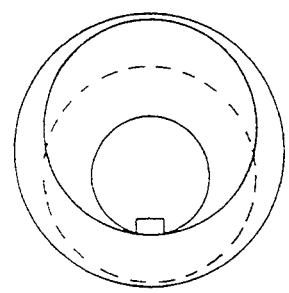
FIG. 7B is similar to FIG. 7A but depicts the eccentrics in a 90° angular position.
Figure 8E:
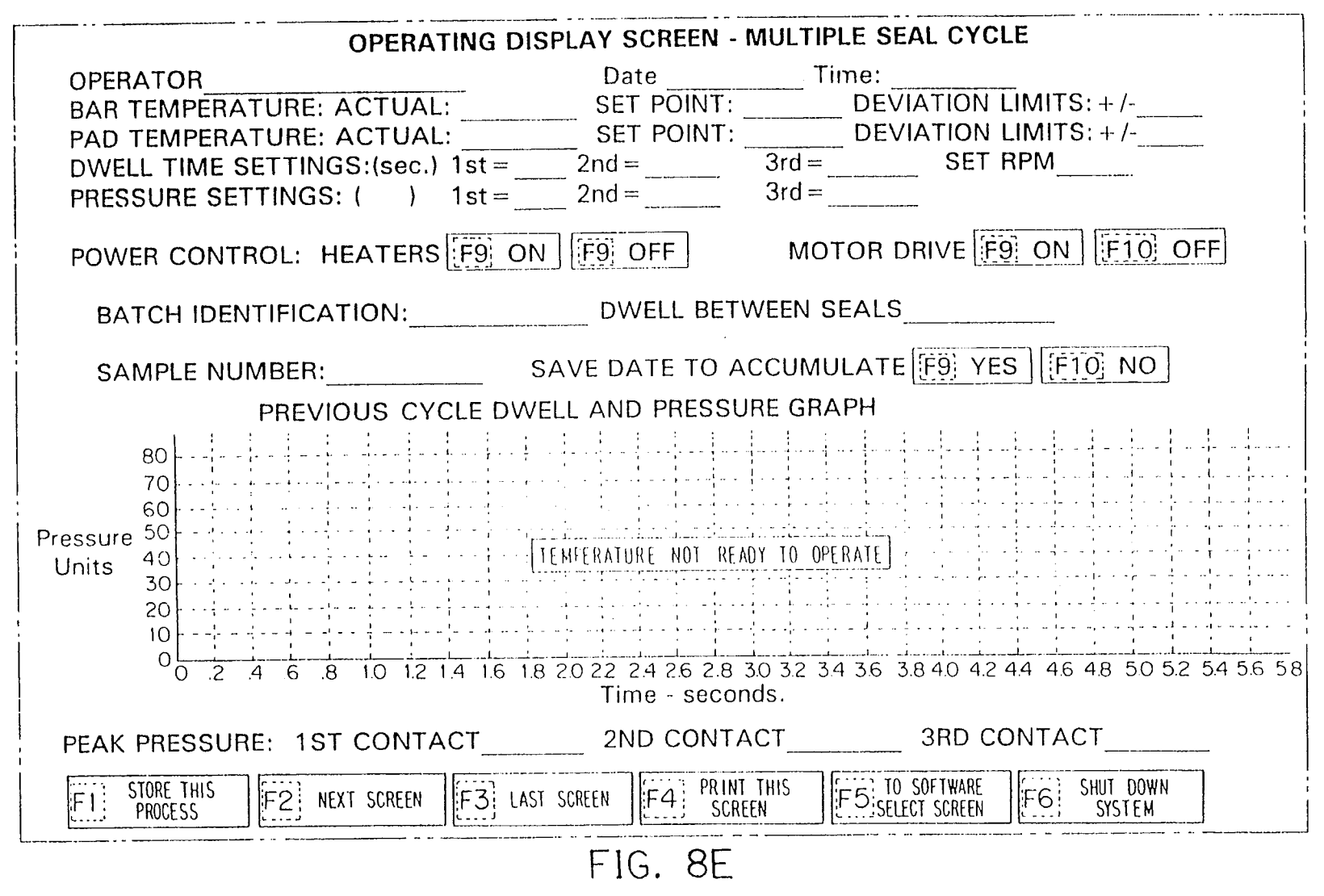

The rotary position of the eccentric shaft 44 is indicated by incremental encoder 50 directly coupled to one end of the eccentric shaft. The eccentric shaft 44 is rotated by the servo motor 34 which has the capability of stopping and holding the eccentric shaft at a predetermined arcuate interval (e.g., 90° as depicted in solid line in FIG. 7B) for the length of the sealing dwell. The shear beam load cell 66 provides a pressure output signal that the computer C compares to a stored chart to confirm that the desired pressure has been achieved. In accordance with this invention, this pressure is constantly adjustable during the sealing dwell so that the servo motor 34 can continuously adjust the position of the eccentric shaft 44 to provide and hold the desired pad pressure through operation of the crankshaft linkage mechanisms 22,40 as aforesaid. FIGS. 8E or 8F depict representative operating display screens which chart the actual pressure conditions between the top and bottom seal bars as a function of the sealing dwell period.

The encoder's single marker per revolution is oriented to indicate when the sealing jaws 12,14 are fully open (i.e., often described as a top zero point of eccentric). During initial startup, the computer C starts the slow motor rotation until the pad load cell 66 indicates contact between the sealing bar and the pad. The motor 34 then reverses to find the encoder 50 top zero point (TDC in FIG. 7A). From this starting point the computer C calls on the operator to activate an auto tune operation.

The auto tune sequence requires the operator to place a sample of the material between the jaws 12,14 and step on the start foot switch (not shown). The computer microprocessor C will cause the drive motor 34 to rotate the eccentric shaft 44 (and encoder 50) at the selected target RPM. The encoder pulses are counted until the load cell 66 indicates near target pressure. Automatic, repeated cycles continue until the eccentric shaft position for the selected pressure has been determined and the encoder count stored for duplication in subsequent sealing cycles. If the constant pressure mode has been selected, the drive motor 34 will be directed to move from a locked, holding condition to correct the pressure. This advantageously results in thermal swell compensation and adjusts for thickness reduction during plastic flow under sealing pressure.

The pressure load cell 66 is the source of signal to start the dwell timer counting in the microprocessor C. This initial contact signal precedes the stopping of the crankshaft 22,40. Crankshaft reverse rotation is initiated by the microprocessor C prior to the end of the programmed dwell period. Dwell is programmed in tenths of a second, up to thirty seconds, as aforesaid.

The crankshaft rotary motion is limited to about 180° (bottom dead center) but the sealing bar impact velocity can be changed by setting a different RPM for the drive motor 34. The motor controller determines the acceleration rate and target RPM to simulate production speed as aforesaid. The invention provides accurate data accumulation from each sealing operation (FIGS. 8G and 8H), including a pressure and dwell graph of each just completed sealing action, FIGS. 8E and 8F. The graphs clearly depict variations in pressure with average, high and low results. A series of samples can be run and the conditions retained and documented in printed form, thereby verifying system performance.

Although the heat-sealing machine 10 of the presently preferred embodiment is disclosed for use as a precision laboratory heat-sealer for simulating actual production conditions to verify seal reliability as a function of preselected operating parameters, it will be understood from a review of this disclosure that the methodology and mechanisms of this heat-sealer may also be incorporated in production machines. In particular, the manner in which the sealing pressure conditions are achieved and controlled through the eccentric control crankshaft, with the ability to self adjust the pressure during the sealing dwell, as a function of load cell feedback to the microprocessor control to adjust or maintain the eccentric position, has the potential for greatly improving and monitoring sealing pressure conditions in an actual production run environment.

Figure 9:
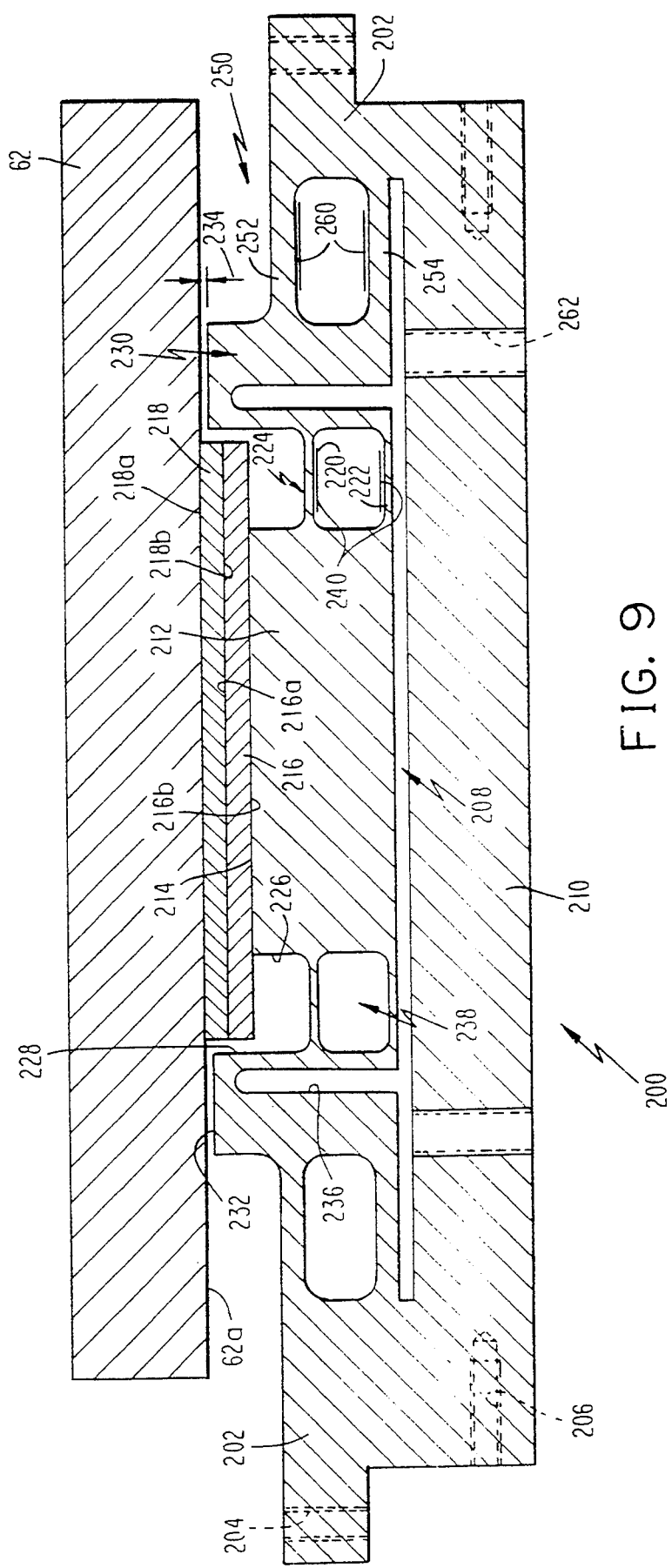
FIGS. 9 and 10 are respectively preferred and alternate embodiments of a load cell constructed in accordance with the inventions herein.

Load cell 66 in the heat-sealing machine 10 of the invention described above is conventionally available. However, in accordance with a further feature of the invention, support link 86 may be substituted with a support link 200 integrally formed with a load cell as is depicted in FIG. 9. Therein, the opposite end portions 202 of the support link 200 are respectively formed with a pair of vertical threaded bores 204 for reception of the leveling screws 96 as depicted in FIG. 1, and are also formed with horizontally extending threaded bores 206 to receive the clamping screws 20 for connection to the left and right hand frames 16 as depicted in FIG. 3. Intermediate these opposite ends 202 is a thin horizontally extending cavity 208 which divides the link 200 into upper and lower portions. The upper portion above cavity 208 uniquely functions as a load cell and the lower portion 210 functions as a supporting portion therefor.

The portion of the so-called support link 200 extending upwardly from the dividing cavity 208 and between the opposite end portions 202 includes a central load-bearing portion 212 of preferably rectangular cross-section in both longitudinal and lateral directions. The horizontal upwardly directed flat surface 214 of the load-bearing portion 212 is adapted to receive a layer of thermally isolating material 216 thereon having parallel top and bottom surfaces 216a and 216b, the top surface 216a supporting a layer of shim stock 218 also having top and bottom parallel surfaces 218a and 218b. The support bar 62 containing the bottom seal pad 38 rests on the top surface 218a of the shim 218 which transmits the entire weight and loading thereon to the load-bearing portion 212.

The load-bearing portion 212 is interconnected at each opposite longitudinal end thereof to one of the end portions 202 of the support link 200 through a pair of thin top and bottom deflection beams 220 and 222. Each top beam 220 defines the bottom wall of an upwardly directed U-shaped channel 224, an inner vertical wall of which channel is defined by the uppermost vertical side wall section 226 of the load-bearing portion 212 intersecting the top surface 214 thereof. The outer vertical channel side wall 228 defines the innermost extent of a second upper portion 230 of the support link 200 extending transversely adjacent the load-bearing portion 212 and to which the top and bottom beams 220,222 are connected. The dividing cavity 208 extends beneath both these second or intermediate upper portions 230 as well the load-bearing portion 212 and both sets of the top and bottom deflection beams 220,222 respectively connecting the load-bearing portion to the intermediate portions. Thus, the load-bearing portion 212 is suspended above the cavity 208 and totally supported by the intermediate portions 230 through the top and bottom beam sets 220,222.

The top surface 232 of each intermediate portion 230 is a horizontal flat surface located elevationally above the top surface 214 of the load-bearing portion 212 and adapted to be spaced downwardly from the bottom surface 62a of the bottom seal pad support bar 62 through appropriate selection of the shim stock 218. The resulting gap 234 limits the extent to which the top and bottom beams 220,222 may deflect under load, i.e., maximum deflection occurs when the bottom surface 62a of the support bar 62 contacts the top surface 232 of the intermediate portions 230.

Each intermediate portion 230 further includes a deflection compensating slot 236 which opens at the bottom thereof into the dividing cavity 208 and terminates at its upper closed end adjacent the top surface 232 as depicted in FIG. 9. The purpose of this vertically extending deflection compensating slot 236 is described below.

The bottom beams 222 are spaced downwardly from the top beams 220 in parallel relation thereto to define a closed cavity 238 therebetween of substantially rectangular cross-section. These bottom beams 222 also overlie the dividing cavity 208, as aforesaid. Strain gauges 240 of known construction are disposed on each of the top and bottom beams 220,222 to measure loads imposed thereon.

As depicted in FIG. 9, the bottom seal support bar 62 rests on the shim stock 218. As the top seal bar 12 exerts clamping pressure against the bottom seal pad 38, the top and bottom beams 220,222 begin to deflect downwardly as the load-bearing portion 212 is depressed under load. FIG. 11 is an illustration of the load-bearing portion 212 under load induced deflection. The vertical deflection compensating slot 236 expands under the deflection force in the direction of arrow A to prevent torsional twisting movement of each set of the top and bottom beams 220,222.

Figure 10:
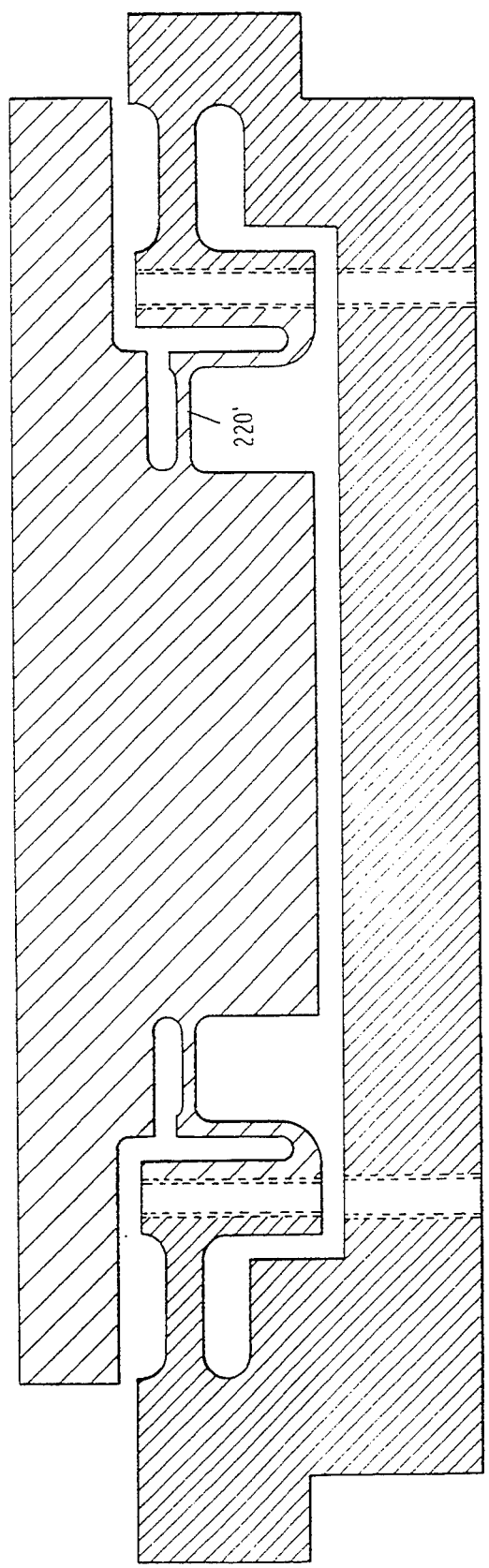

So far as the bottom support bar 62 does not contact the intermediate bridging portions 230 connecting the load-bearing portion 212 to the remainder of the support link 200, the strain gauges 240 fixed to the top and bottom beams 220,222 are capable of accurately measuring the loads imposed on the load-bearing portion 212. Although the top and bottom beams 220,222 may be substituted with a single beam 220' as depicted in FIG. 10, the feature of providing two parallel beams advantageously minimizes the likelihood of twisting that could otherwise occur in a single beam under load.

In accordance with a further unique feature of the load cell 200 of the present invention, a second set 250 of top and bottom beams 252 and 254 respectively interconnect the intermediate bridging portions 230 and thereby the load-bearing portion 212 to the lower supporting portion 210 through the end portions 202. These second sets 250 of top and bottom beams 252,254 overlie the ends of the thin, elongate dividing cavity 208, respectively, and are thicker than the first beam sets 220,222 to advantageously provide a structure wherein pressures may be measured accurately in low pressure ranges and progressively higher pressures will not the low pressure beams, which may or may not be contiguous with each other. For example, the thickness and relative lengths of the first beam sets 220,222 relative to the remainder of the load cell structure may be configured to measure load induced pressured within a predetermined "low" pressure range until such time as the bottom support bar 62 contacts the top surface 232 of the intermediate bridging portions 230. After such bottoming occurs, the load-bearing portion 212 as well as the intermediate portions 230 are now solely supported by both second beam sets 250. The thickness and length of these second beam sets 250 may be selected and provided with suitable strain gauges 260 which now serve to measure additional pressures within a "high" pressure range contiguous with the low pressure range as the portions 212,230 (bottomed out against 62) are depressed in unison under load.

To prevent permanent deformation of the load cell structure during high pressure testing, a pair of limit screws are respectively received through vertical, threaded throughbores 262 extending through the supporting portion 210 in vertical alignment with the intermediate bridging portions 230, inwardly adjacent the second beam sets 250. The upper ends of the limit screws thus enter the dividing cavity 208 and are spaced (not shown) beneath the intermediate portions 230 by a predetermined amount to contact the intermediate portions under high pressure deflection to thereby limit further movement and possible permanent deformation.

It will be understood by one of ordinary skill in the art that the load cell 200 of the present invention may be utilized in machines other than heat-sealing machine 10 of the present invention and that modifications to the load cell structure may be made to accommodate load cell usages in different operating environments.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of heat-sealing together portions of a fusible film or coated material, comprising the steps of:
    (a) providing a pair of sealing jaws and relatively moving said sealing jaws into clamping engagement with said portions and fusing the clamped portions with heat provided by a heating element included with at least one of said jaws to form a heat seal;
    (b) sensing the clamping pressure during a sealing dwell period when said jaws are in damping engagement with said portions, said sensing being accomplished with a load cell connected to one of said jaws; and
    (c) setting, monitoring and adjusting the clamping pressure throughout substantially the entire sealing dwell period to maintain said clamping pressure at a preselected level during said period,
    wherein said sealing jaws are respectively mounted to top and bottom seal bar assemblies, wherein the bottom seal bar assembly includes a support link connected to a machine frame, said load cell is mounted to said support link, a support bar is mounted to the support link to be at least substantially entirely supported by the load cell, and a bottom seal pad is provided on the support bar, said fusible film or coated material being positioned on the bottom seal pad during said sealing.

2. The method of claim 1, wherein one of the sealing jaws is pivoted into and out of clamping engagement with the other of said jaws through a stepper motor or a servo motor operating an eccentric shaft connected to said sealing jaw through a linkage mechanism, and comprising the steps of measuring the precise angular position of the eccentric shaft between top and bottom dead center positions; comparing a sensed clamping pressure with said preselected clamping pressure and adjusting the angular position of the eccentric shaft to attain said preselected clamping pressure as said sensed pressure.

3. The method of claim 2, comprising the further step of controlling the speed at which the eccentric shaft is rotated into a preselected angular position adapted to correspond with said preselected pressure so as to simulate a programmed and preselected production speed at which the sealing jaws are brought together in a production machine.

4. The method of claim 2, wherein the clamping pressure is monitored with a load cell operatively connected to the other of said sealing jaws, and wherein, during initial start-up of said machine, said sealing jaw is moved under slow motor rotation until the load cell indicates contact between the sealing jaws, the motor being reversed to locate the top dead center position of the eccentric shaft.

5. The method of claim 4, comprising the further step of initiating an auto tune sequence to enable the eccentric shaft to rotate at a selected target RPM into a selected angular position corresponding to the preselected clamping pressure.

* * * * *